United States Patent [19]

Takahashi

[11] Patent Number: 4,460,930
[45] Date of Patent: Jul. 17, 1984

[54] ERRONEOUS ERASURE PREVENTING APPARATUS

[75] Inventor: Kiyoshi Takahashi, Machida, Japan

[73] Assignee: Sony Corporation, Tokyo, Japan

[21] Appl. No.: 328,952

[22] Filed: Dec. 9, 1981

[30] Foreign Application Priority Data

Dec. 16, 1980 [JP] Japan .............................. 55-180506[U]

[51] Int. Cl.³ .............................................. G11B 15/04
[52] U.S. Cl. ........................................ 360/60; 360/132
[58] Field of Search .................... 360/60, 132; 206/387

[56] References Cited

U.S. PATENT DOCUMENTS

| | | | |
|---|---|---|---|
| 2,612,565 | 9/1952 | Heller | 179/100.2 |
| 3,416,150 | 12/1968 | Lindberg, Jr. | 340/174.1 |
| 3,828,363 | 8/1974 | Somers | 360/60 |
| 3,950,786 | 4/1976 | Shapely | 360/132 |
| 4,041,537 | 8/1977 | Kishi | 360/60 |

Primary Examiner—Bernard Konick
Assistant Examiner—Paul Stefanski
Attorney, Agent, or Firm—Hill, Van Santen, Steadman & Simpson

[57] ABSTRACT

An erroneous erasure preventing piece to be detected is formed simultaneously with disk cassette covers by a molding process. The piece has a configuration which enables it to be slidably remounted to the cassette disk covers after being torn off the cover.

11 Claims, 7 Drawing Figures

ERRONEOUS ERASURE PRVENTING APPARATUS

BACKGROUND OF THE INVENTION (1) Field of the Invention

The present invention relates to an erroneous erasure preventing mechanism for a recording/reproducing device of a tape cassette, a disk cassette, or the like.

(2) Description of the Prior Art

An erroneous erasure preventing mechanism for prevention of erroneous erasure of recorded signals is generally included in a tape cassette holding a magnetic tape or a disk cassette holding a magnetic disk.

Referring to FIG. 1, a recess 2 is formed at a predetermined position of a conventional audio cassette 1, for example at the back of the cassette 1, and an erroneous erasure preventing detent 3 is integrally formed to close the recess 2. The tape recorder has a detector piece 4 at a position corresponding to the recess 2 of the mounted cassette 1 in such a manner that the detector piece 4 may extend inside the recess 2. This detector piece 4 controls the operation of a microswitch 5 as shown in FIG. 1.

In the initial condition of a tape cassette, that is with a new or unused tape cassette, the erroneous erasure preventing detent 3 closes the recess 2 as indicated by the solid line in FIG. 1, and the detector piece 4 cannot extend inside the recess 2. Under this condition, the tape recorder can record signals on a magnetic tape inside the tape cassette 1.

In order to prevent erroneous erasure of recorded signals, the erroneous erasure preventing detent 3 of the tape cassette is torn off to open the recess 2. When the tape cassette with the torn erroneous erasure preventing detent 3 is mounted on the tape recorder, the recess 2 is open. Therefore, as indicated by the broken line in FIG. 1, the detector piece 4 extends into the recess 2. Then, the microswitch 5 operates, so that the tape recorder may not initiate recording operation. Even if the user erroneously operates the recording button of the tape recorder, recording is not initiated and the signals recorded on the tape are not inadvertently erased.

In this manner, with the erroneous erasure preventing mechanism for a conventional audio compact cassette, the presence or absence of the erroneous erasure preventing detent 3 of the tape cassette 1 is detected by the detector piece 4 of the tape recorder to thereby operate the microswitch 5 and control the recording operation of the tape recorder. However, with this conventional configuration according to which the erroneous erasure preventing detent 3 is torn off the cassette 1, re-recording on the magnetic tape in the cassette 1 in which the erroneous erasure preventing detent 3 has been torn off requires closing of the recess 2 with another member such as adhesive tape, resulting in inconvenience.

Erroneous erasure preventing mechanisms which allow repeated use are known wherein the recess 2 is closed with a detachable closing member, or the recess 2 is opened or closed with a lid of a louver type. With the former mechanism, the closing member, once detached, tends to become lost. Furthermore, since the closing member must be manufactured separately, the manufacturing cost becomes expensive. With the latter method, the structure becomes complex, also resulting in a higher manufacturing cost.

SUMMARY OF THE INVENTION

It is a primary object of the present invention to provide a new accidental erasure preventing system for use on a cassette for magnetic media.

It is a secondary object of the present invention to provide a novel accidental erasure preventing apparatus in which a detecting piece is slidably remountable on a cassette case.

It is a further object of the present invention to provide a slidably remountable detecting piece of an accidental erasure preventing system together with a corresponding portion of an upper or lower half of the case formed simultaneously by a molding process.

DETAILED DESCRIPTION OF THE PREFERRED EMBODIMENT

Figure 1:
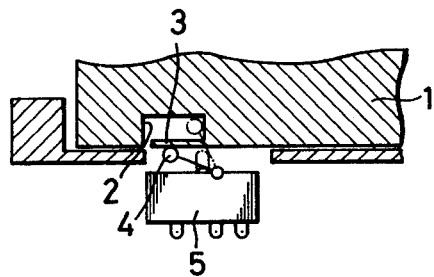
FIG. 1 is a top view of a prior art erasure preventing mechanism.
Figure 2:
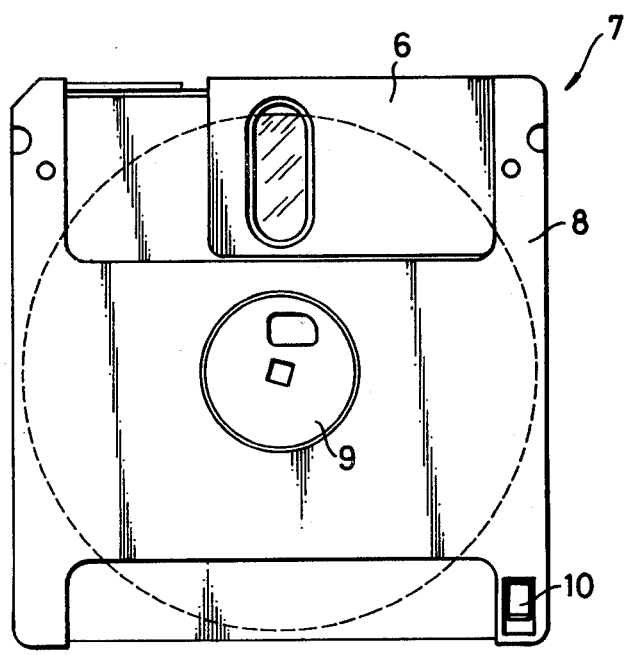
FIG. 2 is a top view of a disc cassette with an erasure preventing mechanism according to the invention.

Referring to FIG. 2, a disk cassette 7 has cassette covers 8 of a synthetic resin such as an ABS resin. The cassette covers 8 house a magnetic disk 9. An erroneous erasure preventing mechanism 10 is incorporated at a predetermined position of the cassette covers 8 on the back side of the disk cassette 7, that is, the side of the disk cassette 7 which faces the tape recorder when it is mounted thereon. Reference numeral 6 designates a slidable shutter. Referring to FIGS. 3 to 7 in which the cassette covers are drawn such that the top surface shown in FIG. 2 is left upside down, the cassette covers 8 are shown comprised of an upper half 11 and lower half 12. The erroneous erasure preventing mechanism 10 includes erasure preventing detecting recess or aperture 13 formed at a predetermined position of the cassette covers 8, and a piece to be detected 14 within this recess 13 which is formed simultaneously therewith. At the side of the lower half 12, the recess 13 has a rectangular opening, and on the long sides of the recess sliding grooves 15 serving as guide portions are formed. The piece to be detected 14 comprises a rectangular flat main body 18 and elastic stoppers or hooked portions 19 and 20 serving as engaging portions are arranged at the short sides of the main body 18, and has a substantially inverted U-shaped section. Length 1 of the long side of the main body 18 is substantially equal to width w of the short side of the recess 13.

Figure 3:
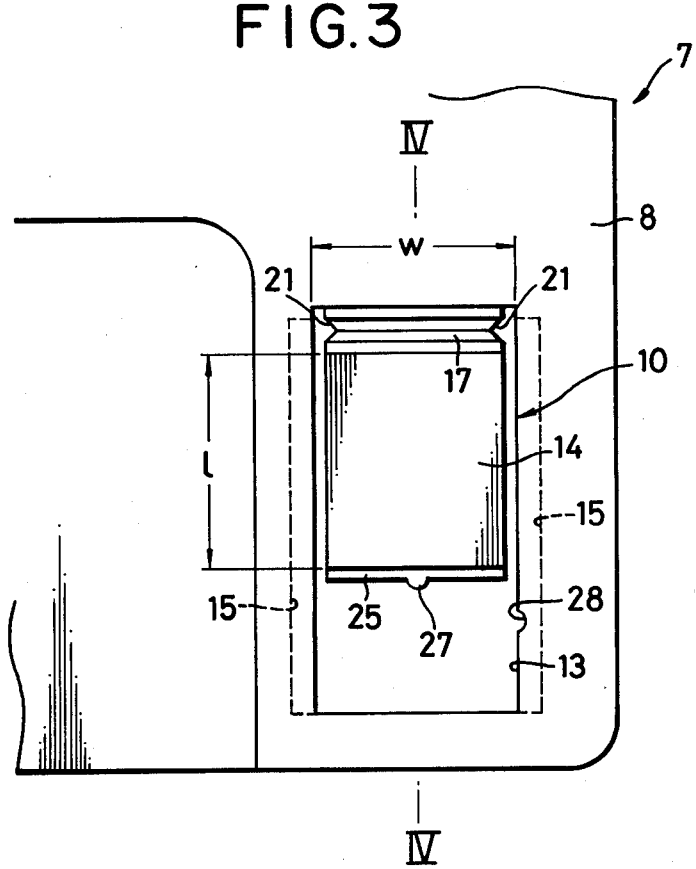
FIGS. 3 and 4 are detailed top and cross sectional views respectively of the mechanism of FIG. 2.
Figure 4:
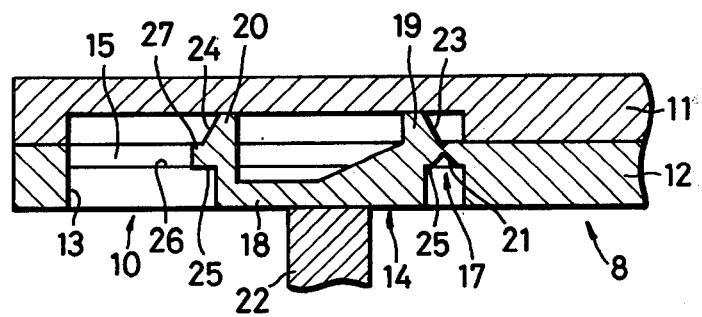

As shown in FIGS. 3 and 4, the detecting piece 14 is formed integrally with the lower half 12 of the cassette covers 8 by methods such as an injection mold processing. The detecting piece to be detected 14 is connected to the lower half 12 through the elastic stopper 19 and a connecting portion 17 of the recess 13. A notch 21, for facilitating tearing off of the detecting piece to be detected 14, is formed in the connecting portion 17. Under this condition, the detecting piece to be detected 14 is at a position corresponding to a position at which a detector piece 22 of the disk recorder contacts the main body 18. Therefore, when the disk cassette 7 is mounted to the disk recorder, the detector piece 22 of the disk recorder contacts the main body 18 and cannot extend inside the recess 13. The disk recorder can perform recording of signals on the magnetic disk 9 under this condition.

Figure 5:
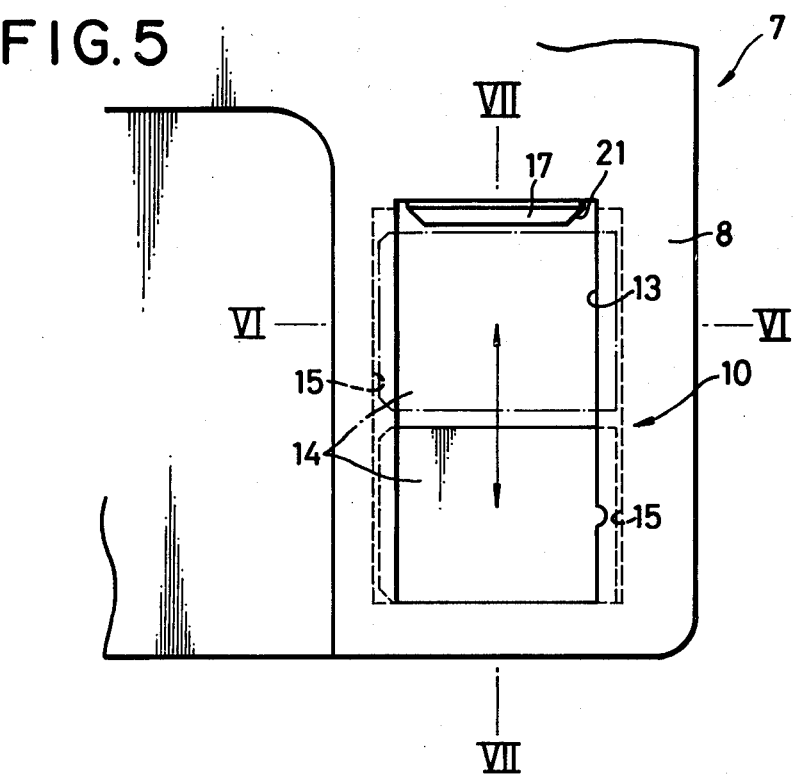
FIGS. 5, 6, and 7 are top and cross sectional views of the mechanism of FIG. 3 but with the mounted piece detached, rotated, and received in slidable fashion in a cooperating recess.
Figure 6:
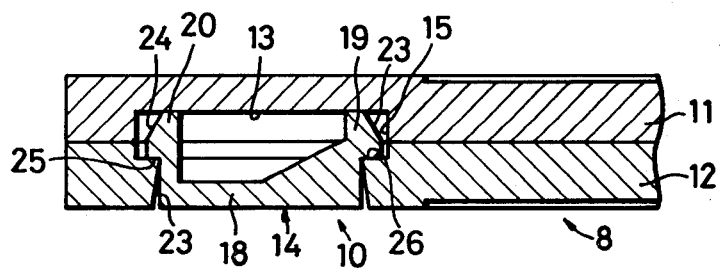
Figure 7:
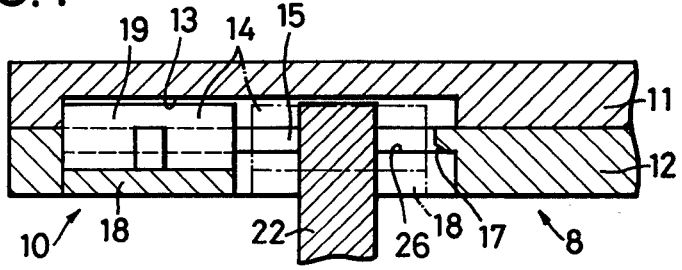

In order to prevent erroneous erasure of the signals recorded on the magnetic disk 9, the detecting piece to be detected 14 is torn off at the notch 21 as with the conventional erroneous erasure preventing detent. Referring to FIGS. 5 to 7, the torn detecting piece to be detected 14 is rotated through 90° about a vertical axis with respect to the main body 18 and is then pressed into the recess 13 to be mounted therein. As shown in FIG. 6, according to this embodiment the elastic stoppers 19 and 20 of the opening of the recess 13 and the piece 14 have tapered surfaces 23 and 24, respectively. With the tapered surfaces 23 and 24, a push on the piece 14 toward the recess 13 can easily effect fitting of the piece 14 inside the recess 13. As may be seen from FIG. 6, engaging surfaces 25 of the elastic stoppers 19 and 20 engage with engaging surfaces 26 of the slidable grooves 15, so that the mounted piece 14 may be prevented from dropping out and may be held in sliding fashion along the slidable grooves 15, as shown in FIGS. 5 and 7.

In order to prevent erroneous erasure of signals recorded on the magnetic disk 9, the piece 14 need only be moved to the position indicated by the solid line in FIGS. 5 and 7. When the disk cassette 7 under this condition is mounted on the disk recorder, the detector piece 22 extends into the recess 13 as shown in FIG. 7. Under this condition, the disk recorder cannot perform the recording operation. Therefore, even if the user erroneously depresses the recording button of the recorder, erasure of the signals recorded on the magnetic disk 9 is prevented.

For rerecording on this disk cassette 7, the piece 14 is slid to the position indicated by the alternate long and short dash line in FIGS. 5 and 7. With the disk cassette 7 in this condition, the detector piece 22 of the disk recorder contacts the main body 18 of the piece 14 and cannot extend into the recess 13, as in the case of FIG. 4 so that the disk recorder may perform the recording operation.

According to the embodiment of the present invention, after the piece 14 is torn off and fitted into the recess 13, the disk cassette 7 may serve for repeated use by simply sliding the piece 14 from the position indicated by the solid line to the position indicated by the alternate long and short dash line in FIGS. 5 and 7.

According to this embodiment, the elastic stoppers 19 and 20 are tightly attached to the inner surface of the recess 13 by the elastic recovery force thereof to hold the piece 14 at the perdetermined position. However, other configurations may be adopted. For example, a projection 27 may extend from the piece 14 and this projection 27 may be fitted in a hole 28 formed at a predetermined position of the recess 13, so that the piece 14 may be click stopped. The present invention has been described with reference to an embodiment of an erroneous erasure preventing mechanism for a disk cassette. However, the present invention is applicable not only to the erroneous erasure preventing mechanism for disk cassettes but also to the erroneous erasure preventing mechanisms for various other kinds of recording/reproducing devices which house recording media in covers, such as audio tape cassettes, video tape cassettes or the like. Detection of the piece 14 may also be performed by optical detecting means. For example, the bottom surface of the recess 13 may comprise a transparent body and the light emitted from a light source and transmitted therethrough may be blocked by the piece 14, thereby allowing detection of the piece 14.

As above described, in the erroneous erasure preventing mechanism according to the present invention, a recess with engaging parts is formed in the cassette covers housing the recording medium. A piece to be detected with elastic engaging parts is formed integrally with the covers at a position inside the recess which allows the recording operation of the recording/reproducing device. When the piece is detached from the case, the elastic engaging parts of the piece engage with the engaging parts of the recess, so that the piece may be slidable in the recess between the position which allows the recording operation and the position which inhibits the recording operation of the recording/reproducing device. Accordingly, a tape cassette or the like may be provided for repeated recording. In addition to this, a separate member such as adhesive tape need not be used as in the conventional erroneous erasure to prevent detents. Furthermore, since the piece to be detected is formed integrally with the cover, the manufacturing cost is as low as the conventional erroneous erasure preventing detent. Since the torn piece to be detected is constantly held in the recess, the piece may not be inadvertently lost.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An erroneous erasure preventing apparatus for a cassette having a cover and a recording medium mounted therein, comprising: a rectangular detecting aperture having long and short sides molded in the cover; a pair of guide portions formed on each of the rectangular detecting aperture long sides and opposite one another; a detachable piece to be detected simultaneously formed by molding when said cover is molded where said aperture is formed, said detachable piece having a length which is longer than a width of said rectangular detecting aperture and having engaging portions cooperable with said guide portions so as to be remountable and slidable between recording and non-recording positions in said aperture by engagement with and between said guide portions after a detachment of the detachable piece from the cover; and said detachable piece prior to detachment and when it is an integral portion of said cover being located in said detecting aperture so that it is in said recording position.

2. An erroneous erasure preventing apparatus according to claim 1 wherein said detachable piece has a flat main body a length of which is approximately equal to the width of said rectangular detecting aperture.

3. An erroneous erasure preventing apparatus according to claim 1 wherein said detachable piece engaging portions comprise a pair of hook portions engageable with said pair of guide portions of said aperture.

4. An erroneous erasure preventing apparatus according to claim 3 wherein said pair of hook portions are flexible and each have tapered guide portions arranged such that said detachable piece can be easily inserted into said detecting aperture by flexing the hook portions inwardly by use of said tapered guide portions as the detachable piece is press fit into the detecting aperture.

5. An erroneous erasure preventing apparatus according to claim 1 wherein said cover comprises upper and lower cover portions and said rectangular detecting aperture comprises a recess form molded in one of the cover portions.

6. An erroneous erasure preventing apparatus according to claim 1 wherein the rectangular detecting aperture comprises a recess and the detachable piece is integrally mounted before detachment within the recess and extends from a short side wall of the recess by a thinned connecting portion designed so as to permit separation of the detachable piece from the cover when the detachable piece is bent away from the recess.

7. An erroneous erasure preventing apparatus according to claim 1 wherein a notch is provided on the length side of the aperture and a mating projection is formed on the detachable piece which engages in the notch when the detachable piece after detachment from the cover is slid along the guide portions to a given position within the aperture.

8. A cassette having an erroneous erasure preventing mechanism, comprising: a cassette cover and a recording medium mounted therein; a rectangular recess mounted in the cover; a detachable piece to be detected detachable and integrally connected to the cover by a connecting portion and being positioned within the recess in a position permitting erasure and recording; guide portions on opposite side walls of the recess; the detachable piece being dimensioned and having engaging portions such that after it is detached from the cover it can be inserted into the recess such that the engaging portions are engageable with the guide portions and the piece is slidable within the recess between a first position permitting recording and a second position preventing recording.

9. The cassette of claim 8 wherein the portions on the detachable piece comprise hook members.

10. The cassette of claim 9 wherein the hook members extend upwardly from a main body portion and are flexible such that when they are compressed inwardly towards each other they permit the detachable piece to snap fit into the recess.

11. An erroneous erasure preventing apparatus for a cassette having a cover and recording medium mounted therein, comprising: a rectangular detecting recess formed in the cover having long and short side walls; a pair of guide indentations arranged opposite one another and in the long side walls; a detachable piece to be detected having a length corresponding to a width between the side walls of the recess, said detachable piece being integrally mounted within the recess by a molded connecting piece extending from the short side wall of the recess to a short side wall of the detachable piece; the detachable piece prior to detachment being positioned in a position permitting the cassette to be erased and/or recorded on; and the detachable piece having at its short side walls means for engagement with said guide portions such that when the detachable piece is detached from the cover it can be reinserted into the recess and slidable between first and second positions representative of recording and non-recording positions by use of said guide portions.

* * * * *